Figure 1:
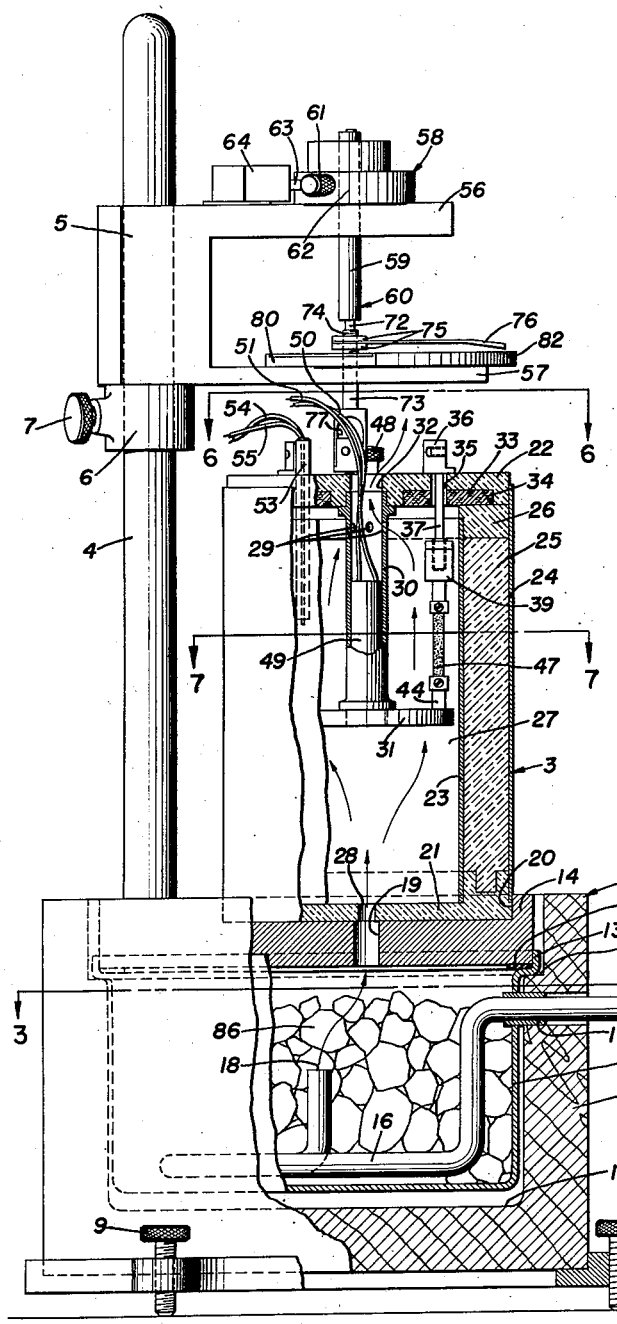

Dec. 18, 1951     S. D. GEHMAN     2,579,424
APPARATUS FOR MEASURING LOW-TEMPERATURE
STIFFENING OF ELASTOMERS

Filed June 8, 1948     3 Sheets-Sheet 1

*INVENTOR.*
SAMUEL D. GEHMAN
BY
ATTORNEY

Dec. 18, 1951  S. D. GEHMAN  2,579,424
APPARATUS FOR MEASURING LOW-TEMPERATURE
STIFFENING OF ELASTOMERS
Filed June 8, 1948  3 Sheets-Sheet 2

INVENTOR.
SAMUEL D. GEHMAN
BY
ATTORNEY

Dec. 18, 1951 S. D. GEHMAN 2,579,424
APPARATUS FOR MEASURING LOW-TEMPERATURE
STIFFENING OF ELASTOMERS
Filed June 8, 1948 3 Sheets-Sheet 3
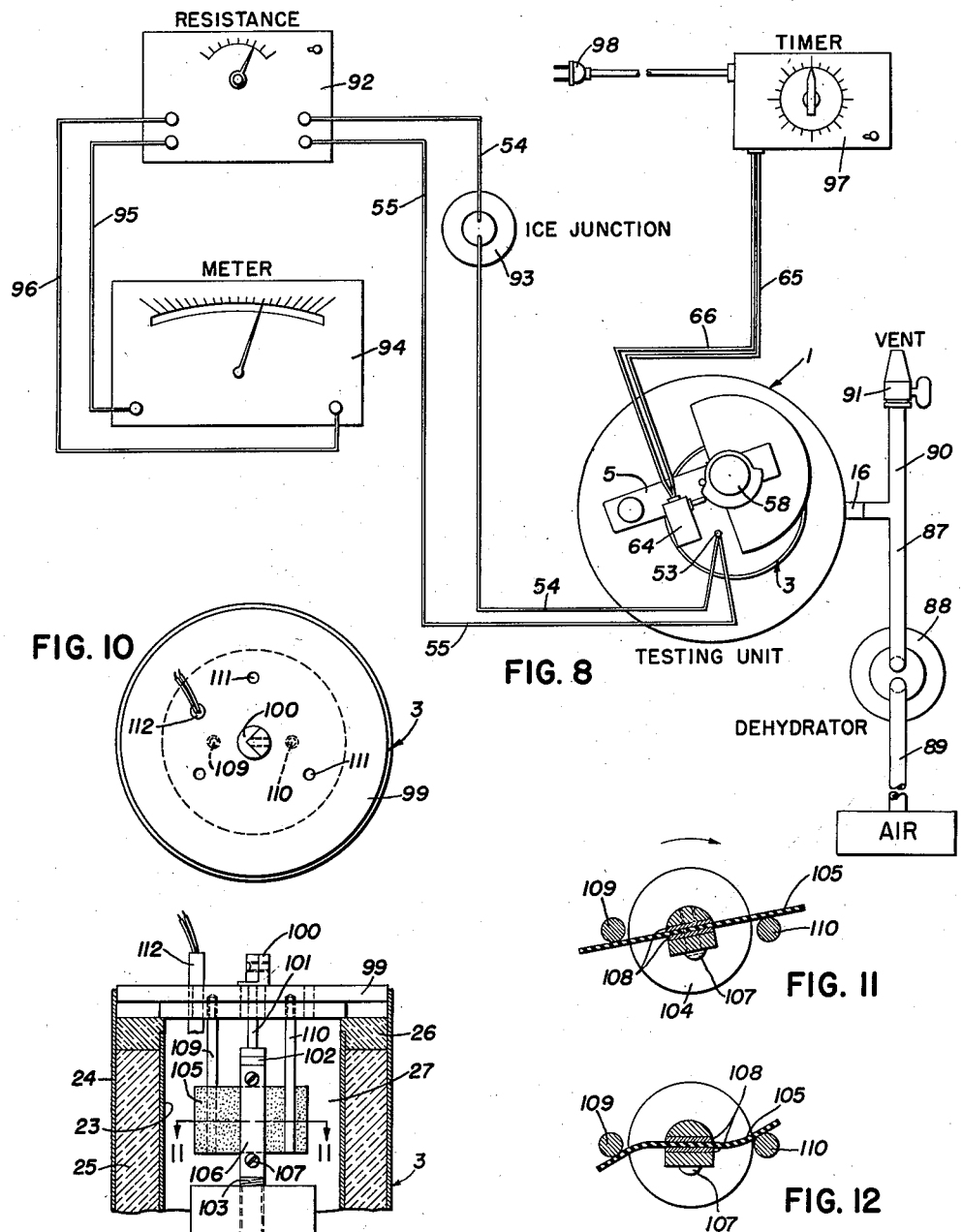
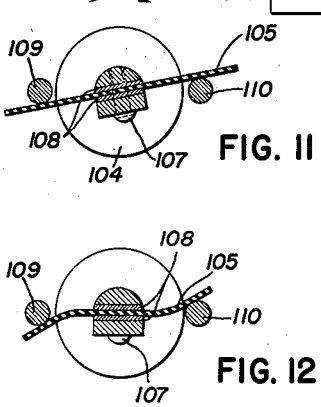
*INVENTOR.*
SAMUEL D. GEHMAN
BY
ATTORNEY Patented Dec. 18, 1951

2,579,424

UNITED STATES PATENT OFFICE 2,579,424

APPARATUS FOR MEASURING LOW-TEMPERATURE STIFFENING OF ELASTOMERS

Samuel D. Gehman, Akron, Ohio, assignor to Wingfoot Corporation, Akron, Ohio, a corporation of Delaware Application June 8, 1948, Serial No. 31,680

9 Claims. (Cl. 73—15.6)

The present invention relates to a means for determining the effect of low temperatures on elastomers, such as rubber, plastics, rubber and plastic coated fabrics, and the like. More particularly, the invention pertains to an apparatus for testing the stiffness of elastomers when subjected to extremely low temperatures.

In the use of rubber, plastics, rubber and plastic coated fabrics, and the like under Arctic conditions, the extremely low temperatures encountered may cause the material to stiffen, thereby limiting its usefulness. Most conventional forms of testing equipment for determining the effect of low temperatures on such materials do not satisfactorily forecast the reactions of the material under such extreme conditions.

The most generally applicable type of test is one which gives a measure of the stiffness over a range of temperatures low enough to include the transition region through which the long-chain molecules lose the ability to unkink or uncoil, so that rubber, for example, becomes essentially an ordinary solid. Such modulus determinations have been made in a wide variety of ways using either stretching, bending, or torsional deformations. A modulus or stiffness test is sufficient in a general way for many purposes and is a useful guide for compound and polymer development.

Thus, it is an object of the present invention to provide a novel and convenient form of torsion apparatus which is useful in securing data from the testing of sample elastomers.

It is a further object of the invention to reproduce as nearly as possible the temperature conditions to which the various elastomers will be subjected in use and to facilitate the prediction of their reaction to such conditions.

The apparatus of the present invention is unique in that it employs a torsion element which is coupled in series with the sample being tested. Thus, the torsional deformation is absorbed partly by the torsion element and partly by the sample to permit greater accuracy in the test data. The novel apparatus employs a wire as the torsion element.

The proper torsion element to facilitate the test may advantageously be selected from a group of wires having known degrees of stiffness. Thus, a scale reading within the desired range on the apparatus may be quite readily obtained.

Certain unknown mechanical factors which may be introduced in other forms of conventional testing equipment tend to supply test data which may result in a wholly misleading forecast as to the reaction of these materials to varying temperatures encountered in the normal use of products made therefrom. The apparatus of the present invention is believed to be completely devoid of any such detrimental factors and their effects.

Other objects and advantages of the apparatus of the present invention will become apparent as the description of a preferred embodiment of the invention illustrated in the accompanying drawings proceeds.

Figure 6:
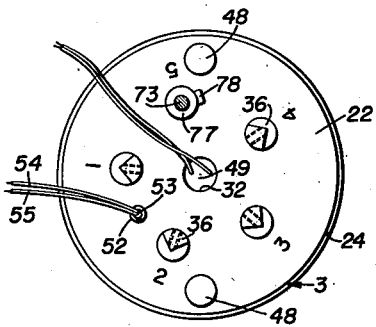
Figure 7:
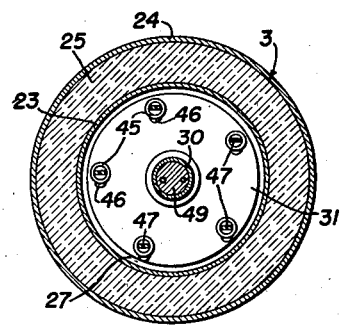
Figure 2:
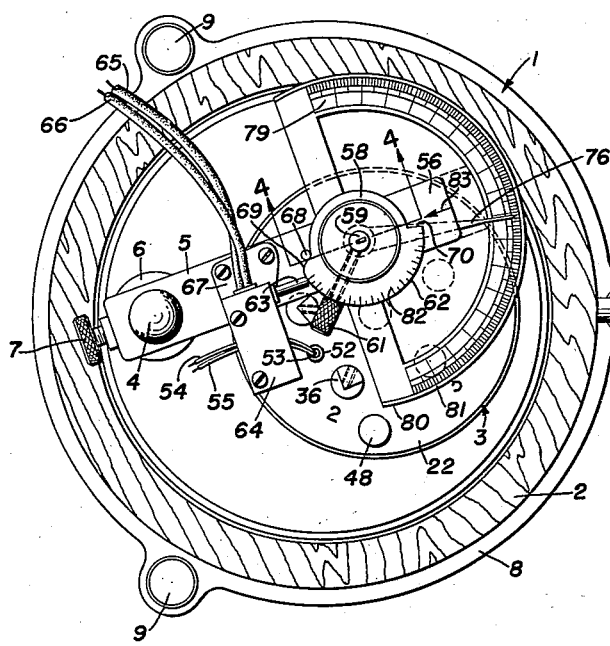
Figure 4:
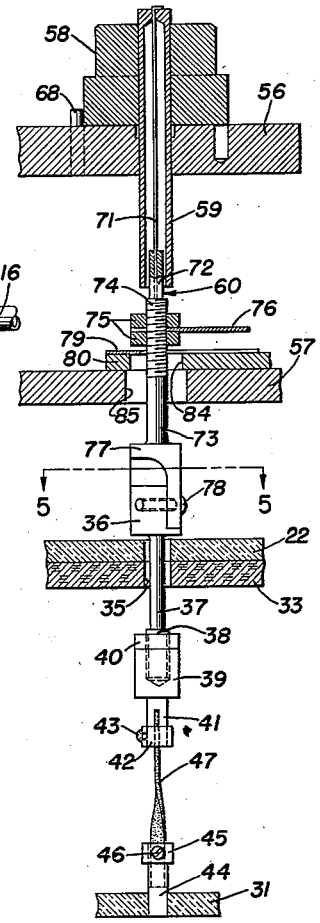
Figure 5:
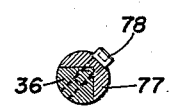
Figure 3:
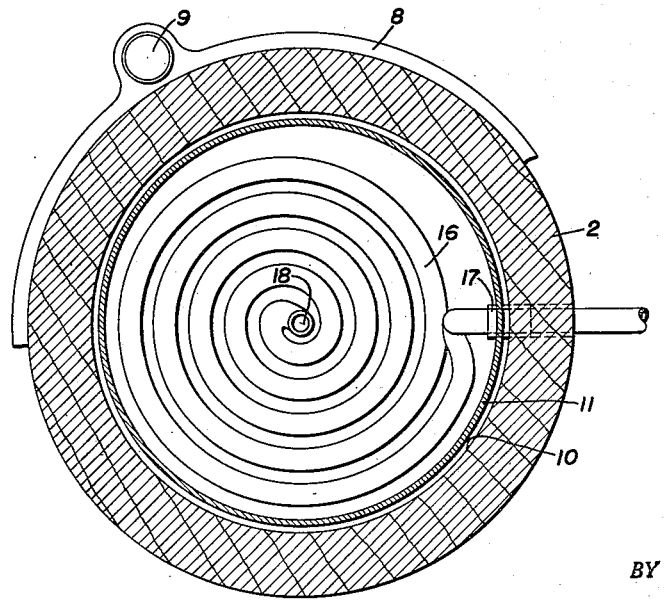

Fig. 1 is an elevation with parts in section and broken away illustrating a preferred form of testing apparatus embodying, and for carrying out, the teachings of the present invention. Fig. 2 is a plan view of the apparatus of Fig. 1. Fig. 3 is a horizontal section taken along the line 3—3 in Fig. 1 and having parts broken away. Fig. 4 is an enlarged elevation of a typical test position with parts in section and broken away. Fig. 5 is a horizontal cross section taken along the line 5—5 in Fig. 4. Fig. 6 is a plan view with parts in section as seen from the line 6—6 in Fig. 1. Fig. 7 is a horizontal section taken along line 7—7 in Fig. 1.

Fig. 8 is a diagrammatic illustration of the complete apparatus employed in the investigation of the effect of low temperatures upon certain physical properties of elastomers in accordance with the principles of the present invention. Fig. 9 is a partial vertical cross section taken through a portion of the apparatus to illustrate a modification of the invention. Fig. 10 is a plan view of the apparatus of Fig. 9. Fig. 11 is a horizontal cross section taken along the line 11—11 in Fig. 9. Fig. 12 corresponds generally to Fig. 11 illustrating the effect on the test piece when certain of the parts are rotated in the direction indicated by the arrow in the latter figure.

One of the essential elements of the assembly illustrated in Fig. 8 of the drawings employed in accordance with the teachings of the present invention is the testing unit identified generally by the reference character 1 and shown in detail in Fig. 1 of the drawings. The testing unit 1 comprises a receptacle or container 2, a generally tubular member or calorimeter 3, a vertically extending support or post 4 on the container, and a bracket or yoke 5 mounted for rotation about the axis of the post. The yoke 5 is capable of being supported and adjustably positioned along the length of the post 4 as by means of the collar 6 having a thumb screw 7 therein.

A ring 8 having a plurality of knurled adjusting screws 9 serves to provide a leveling means to support the container 2. The container 2 which is preferably made of wood has a generally cylindrical cavity 10 for the reception of a pan 11 which is supported in the cavity by the shoulder 12. The uppermost edge of the pan 11 has an outwardly rolled flange portion 13 to engage the shoulder 12 and to receive the base 14 and gasket 15 for supporting the calorimeter 3.

A tube 16, preferably of metal, extends through the wall of the pan 11 and the container 2 having a seal 17 therearound. The tube 16 is coiled in the bottom of the pan 11 (see Fig. 3) with the open end 18 thereof extending vertically and located substantially centrally of the pan. Air or other suitable gas is introduced to the tube 16 emerging from the open end 18 and following the path indicated by the arrows in Fig. 1 passes through the port 19 in the base 14.

The base 14 made substantially in the form of a disc has a circular recess 20 preferably cut or formed off center as shown to receive an end of the calorimeter 3. The calorimeter 3 is of generally cylindrical form embodying a base plate 21, a cap 22, and spaced inner and outer walls 23 and 24, respectively. The base plate 21 and cap 22 are advantageously formed of some suitable insulating material such as Micarta and the like while the space between the walls 23 and 24 is filled with some fibrous insulating material 25 such as glass wool or the like and sealed by the ring 26. These measures serve to prevent heat infiltration and cold losses.

The compartment 27 formed in the calorimeter 3 facilitates the free passage therethrough of the air or gas emitted from the open end 18 of the tube 16. The air enters the compartment 27 through an opening 28 in the base plate 21 which is adapted to register with the port 19 in the base 14. The air escapes from compartment 27 through a plurality of holes 29 in the wall of the tubular support 30 for the rack 31, being discharged to the atmosphere through the hole 32 in the center of the cap 22 into which the end of the support 30 is inserted.

The cap 22, as previously stated, is advantageously molded or cut from insulating material and is provided with a ring 33 of cork or other similar material inserted in groove 34 formed about the hole 32 and on the under side of the cap. A plurality of holes 35 are drilled in substantially equally spaced relation through the cap 22 and the ring 33. As will be seen from Fig. 6, a corresponding number of lugs 36 are provided having stem portions 37 depending therefrom and extending through the holes 35 in the cap 22 into the compartment 27.

The lowermost end of each of the stem portions 37 is threaded as at 38 (see Fig. 4) to receive the upper clamp member 39 threaded thereon and secured in place by a jam nut 40. The clamp member 39 has a slotted portion 41 having a collar 42 thereon secured in place by a screw 43. A lower slotted clamping member 44 is mounted on the rack 31 and is fitted with a collar 45 secured in place by the screw 46. The two clamping members 39 and 44 cooperate to secure the opposite ends of a sample strip 47 of the material to be tested in a manner to be more fully described hereinafter.

The cap 22 of the calorimeter 3 is readily removable to facilitate the mounting of the several test pieces or sample strips 47 in the clamping members 39 and 44. A pair of knobs 48, as shown in Fig. 6 of the drawings, enables the cap 22 to be easily inserted in or removed from the upper end of the calorimeter 3. As will also be noted from Fig. 6, the several sets of lugs 36 and associated clamping elements are conveniently identified by the numbers engraved or stamped adjacent each lug on the surface of the cap 22.

For the sake of uniformity, all of the several test pieces or sample strips 47 employed in the testing of various elastomers are of uniform size and shape. The sample strips 47 are conveniently died out of tensile test sheets and are 1.625 inches in length, .125 inch wide, and .079 inch thick.

A suitable electrical heating element 49 is disposed in the hollow interior of the tubular support 30 for the purpose of quickly effecting a change in the temperature of the interior of the compartment 27 of the calorimeter 3. The electrical conductors 50 and 51 for connection to a suitable source of electrical power extend from the element 49 through the interior of the support 30 and out through hole 32. An opening 52 is provided in the cap 22 for the insertion of a theremocouple 53, one end of which extends downwardly into the compartment 27. A pair of electrical conductors 54 and 55 serve to connect the thermocouple 53 into the operating circuit of the testing equipment in a manner to be described in detail hereinafter.

The yoke 5 on the testing unit 1 is formed with a pair of horizontally projecting parallel legs 56 and 57. The leg 56 of the yoke 5 supports an index head 58 in rotatable relation thereon. The index head 58 has a centrally disposed vertically extending hole therein for the insertion of the uppermost end of the tubular shield 59 of the twisting means 60. A knurled headed screw 61 serves to adjustably secure the shield 59 in the desired vertical relation for the adjustment of the twisting means 60. The screw 61 is disposed horizontally and threaded into the outer periphery of the index head 58 so as to contact the shield 59 when the latter is in place in the head.

The index head 58 has an arcuately formed cam surface 62 of approximately 180 degrees span for contact with the projecting nib 63 of a microswitch 64. The microswitch 64, provided with electrical conductors 65 and 66, is mounted upon a plate 67 which is secured to the leg 56 of the yoke 5. A vertically extending pin 68 in the leg 56 of the yoke 5 serves as a stop to limit the extent of rotation of the index head 58 to the limits defined by the abutments 69 and 70 at the extremities of the cam surface 62.

The twisting means 60 embodies a torsion wire 71 secured to the one end of the tubular shield 59 as shown in Fig. 4 of the drawings in such a way that the wire is freely suspended therein. The wire 71 is secured at the opposite end to the shank portion 72 of a connector 73 which is threaded as at 74 to receive the nuts 75 between which is disposed the pointer 76. The lowermost end of the twisting means 60 takes the form of a head 77 which is shaped as indicated in Fig. 5 so as to interfit with each of the several lugs 36 associated with the calorimeter 3. A machine screw 78 is inserted through a horizontally disposed drilled hole in the head 77 for threaded engagement with a drilled and tapped hole in each of the lugs 36 when the head is interfitted therewith in turn.

The pointer 76 of the twisting means 60 is arranged to sweep an arcuate scale such, for example, as the adjustable mounted protractor 79. The scale or protractor 79 is disposed horizontally for shiftable movement on a supporting surface 80 having a slightly raised lip or flange 81 to enable the protractor to be rotated upon the surface to adjust the zero point on the scale to the starting position of the pointer 76. The upper surface of the index head 58 adjacent the cam surface 62 is provided with a plurality of markings identified by the reference character 82 which are arranged to register with the arrow head 83 scribed on the end of the leg 56 of the yoke 5.

The vertical axis of the connector 73 is arranged to be suspended by the wire 71 and the shield 59 from the index head 58 in substantially coincident relation with the center point of the protractor 79 as will best be seen from Fig. 2. The threaded portion 74 of the connector 73 extends vertically downward through the registering apertures 84 and 85 in the supporting surface 80 and the leg 57 of the yoke, respectively. The entire twisting means 60 is free to impart the desired torsional stress upon the sample strip 47 when the connector 73 and the lug 36 are coupled together upon rotation of the index head 58 to produce the result illustrated in Fig. 4 of the drawings.

The method of determining the effect of low temperatures on the physical properties of various elastomers will best be understood by a detailed description of the operation of the testing unit 1 and its associated apparatus illustrated in Fig. 8 of the drawings.

To begin the testing operation, a supply of broken Dry Ice 86 is placed in the pan 11 of the container 2 forming part of the calorimeter 3. The cap 22 of the calorimeter 3 is removed and a plurality of strips 47 of specified dimensions died out of elastomer test sheet stock, the torsion characteristics of which are to be investigated at low temperatures, are placed in the testing unit 1. The preferred dimensions of the strips 47 are 1.625 inches in length, 0.125 inch wide, and 0.079 inch thick. The ends of the strips 47 are inserted in the slotted clamping means 39 and 44 and fastened securely in place as shown in Figs. 1 and 4 after which the cap 22 is replaced in the calorimeter 3.

The calorimeter 3 is now placed in position as indicated in Fig. 1 on the container 2 and the tube 16 now surrounded by Dry Ice 86 in pan 11 is connected to a suitable supply of air under a slight pressure. A flexible hose 87 advantageously connects the tube 16 to a dehydrator 88 which takes the form of a bottle having a small quantity of acetone therein for the purpose of removing moisture from the air supplied by hose 89, thereby preventing frost formation in the tube. The flexible hose 87 is provided with an exhaust branch 90 having a suitable form of adjustable vent outlet 91 thereon.

The conductors 54 and 55 for the thermocouple 53 are connected with a form of variable resistance unit 92. The conductor 54 passes through an ice junction 93 which serves as a reference for the recording of temperatures. In setting up the apparatus, it is essential that the portion of the conductor 54 which connects with the iron element of the thermocouple 53 of the testing unit 1 and the iron element of the thermocouple (not shown) in the ice junction 93 be an iron wire. The remainder of the conductor 54 coupling the Constantan element of the ice junction thermocouple and the resistance unit 92 can be ordinary copper wire. The same is true of the conductor 55 which couples the resistance unit 92 and the Constantan element of the thermocouple 53.

The resistance unit 92 is adjusted by the use of some known standard, such as Dry Ice, the temperature of which is —78.5 degrees C., to enable the millivoltmeter 94 which is connected to the variable resistance unit 92 by the conductors 95 and 96 to read directly in degrees centigrade.

An additional element of the complete apparatus is an audible timer unit 97 which has a standard plug-in 98 for insertion in a conventional electrical outlet. The timer 97 is controlled by the action of the microswitch 64 connected to the timer by means of the conductors 65 and 66. The timer circuit is normally open, but is closed upon completion of the rotation of the index head 58 in a clockwise direction through a full 180 degrees. As the index head 58 reaches the end of its rotation, the abutment 69 of the cam surface 62 depresses the nib 63 of the microswitch 64 and the timer circuit is closed.

After the calorimeter 3 is in place in the recess 20 of the base 14, it is necessary to rotate the calorimeter bodily about its vertical axis so as to bring the lug 36 associated with position number 1 on the cap 22 into juxtaposition with the head 77. The yoke 5 is swung about as necessary to bring the head 77 of the connector 73 into interfitting relation to the lug 36, whereupon the two elements are secured together by the screws 78. With the twisting means 60 in its normal position of rest and the elements all interconnected, the protractor 79 is carefully rotated in the horizontal plane to bring the zero marking thereon into juxtaposition with the pointer 76.

After all the adjustments and connections indicated above have been made, the apparatus is ready for use as soon as the temperature reading elements indicate that the desired temperature has been reached within the compartment 27. It is ordinarily desirable to begin the tests at the lowest temperature and work upward in increments of 5 to 10 degrees, depending largely upon the nature of the reaction of the particular material being checked. With the present apparatus, it is possible to produce temperatures in the compartment 27 as low as —90 degrees centigrade.

Once the desired temperature is reached in the compartment 27, the apparatus is ready for the test of the first specimen. When the twisting means 60 is at rest, the shoulder 70 at one end of the cam surface 62 is against the pin 68. The technician now grasps the index head 58 and rotates it through 180 degrees or until the rounded shoulder 69 at the opposite extremity of the cam surface 62 contacts the pin 68. At substantially the same time as the pin 68 halts the rotation of the index head 58, the nib 63 of the microswitch 64 will be depressed by the rounded shoulder 69 of the cam surface 62 closing the circuit in which the switch is disposed and initiating the operation of timer 97.

The timer 97 is set to indicate the completion of a ten second interval. At the end of the ten second interval, the technician takes note of the angular position of the pointer 76 with respect to the protractor 79. The maximum scale reading is not used since many specimens tested will undergo some reaction to the torsional stress and cause the pointer 76 to drift materially with respect to the scale in a relatively short time. The ten second interval insures the procurement of more reliable and uniform data.

At the conclusion of the ten second interval, the technician records the angle of twist as indicated by the pointer 76 on the protractor 79 and the temperature reading. It will be noted that the mounting of the pointer 76 is such as will permit freedom of action of the pointer as the index hand is rotated.

It is desirable to have the scale reading on the protractor 79 fall within the range of 120 to 170 degrees. If the sample strip 47 being tested is quite soft, for example, thereby causing the pointer to fall outside the prescribed range, it is possible to adjust the index head 58 with relation to the shield 59 as by means of the screw 61 so that the markings 82 will register with reference to the arrow head 83 on the leg 56 of the yoke 5, an available twist of less than 180 degrees, and will provide a means of determining what number of degrees less than a full rotation is required to bring the pointer 67 into the desired range. Alternatively, a pointer reading in the desired range may be obtained by the selection of a torsion wire of suitable stiffness.

Each individual lug 36 is, in turn, connected to each of the several sample strips 47 and the data recorded for each one in turn. To this end, the calorimeter 3 is rotated bodily to bring the lugs 36 into registry with the head 77 of the twisting means 60. After each of the sample strips 47 has been tested at the desired temperature, the temperature of the compartment 27 is raised as desired by bleeding air out of the vent outlet 91 or by the energization of the heater element 49 or both.

The relative torsional modulus at any temperature is computed as the ratio of the modulus at the low temperature in question to the modulus at 25 degrees C. The modulus is connected with the twist measurement by the relation $$\text{Modulus} \propto \frac{189° - \text{twist}}{\text{twist}}$$

The apparatus requires a slight modification in the nature of that illustrated in Figs. 9 to 12, inclusive, to enable rubber or plastic coated fabric to be tested.

The calorimeter 3 is constructed, as before, with inner and outer walls 23 and 24, respectively, between which an insulating material 25 is disposed and sealed with the ring 26. The ring 26 supports a cap 99 which is generally similar to the cap 22 of the apparatus of Fig. 1. The cap 99 is provided with a single centrally disposed lug 100 like the several lugs 36 of the embodiment of Fig. 1 for demountable connection to the head 77 of the connector 73 forming part of the twisting means 60.

The lug 100 has a shank portion 101 and a clamping portion 102 formed integrally therewith. The lowermost extremity of the clamping portion 102 is threaded as at 103 for the mounting of the weight 104 which serves to retain the unit in proper vertical alignment in the compartment 27 of the calorimeter 3. The fabric sample 105 is secured to the clamping portion 102 by means of the plate 106 held in place by the screws 107 threaded into the clamping portion 102 being insulated from contact with the metal parts by means of the cork insulating pads 108 (see Figs. 11 and 12).

As in the case of the sample strips 47, it is desirable that the fabric test pieces or samples 105 conform to a standard. To this end, the fabric samples employed are 1 inch wide by 2½ inches long.

The flexing of the fabric sample 105 upon rotation of the lug 100 is achieved by the studs 109 and 110 which are fixedly mounted on the under side of the cap 99 so as to project downwardly into the compartment 27 of the calorimeter 3. The studs 109 and 110 are threaded into the cap 99 and are coextensive in over-all length with the fabric sample 105. The cap is provided with several drill holes 111 extending therethrough to serve as vents for the air passing into the base of the compartment 27 from the tube 16 of the testing unit 1 when the several parts are fitted together. The thermocouple 112 extends through a suitable hole in the cap 99 so as to register the temperature of the air in the compartment 27.

Although the above-described structures represent the preferred embodiments of the invention, it will be understood that other modifications than those illustrated may be made in the apparatus without departing from the spirit or scope of the invention.

One of the distinct advantages of the use of the flexible torsion member or wire 71 in the twisting means 60 is the fact that the testing unit 1 is thereby enabled to indicate wide variations in modulus of the elastomers being tested. It is frequently found that the torsion modulus of elastomers will vary in range as much as 500 to 1000 times over the norm when the materials are subjected to extremely low temperatures. No fixed application of force is required in the apparatus of the invention, in spite of the wide ranges covered, by reason of the fact that the wire automatically compensates for or adjusts the torque applied to the sample.

While in accordance with the patent statutes the best known embodiments of the invention have been illustrated and described in detail, it is to be particularly understood that the invention is not limited thereto or thereby, but that the inventive scope is defined in the appended claims.

I claim:

1. Apparatus for measuring low temperature stiffening of elastomers comprising an enclosure; a removable cover for the enclosure; a supporting means suspended from the cover internally of the enclosure; a plurality of stationary clamping means on the supporting means; a number of rotatable clamping means corresponding to that of the stationary clamping means extending through the cover, each of said stationary and rotatable clamping means being adapted to support therebetween a sample of the material to be tested; means producing a controlled predetermined temperature within the enclosure; twisting means externally of the enclosure for disengageable attachment to the rotatable clamping means; a flexible torsion member in the twisting means; and means externally of the enclosure and coacting with the twisting means for indicating the relative degree of twist imparted by the twisting means through the torsion member to the sample.

2. Apparatus for measuring low temperature stiffening of elastomers comprising means for supporting a sample of the material to be tested; an insulated enclosure embodying a compartment encompassing the supporting means; means directing fluid through the compartment; means for subjecting the fluid to controlled predetermined temperature conditions; twisting means disposed externally of the enclosure for imparting a twist to the sample while it is supported by the supporting means; a flexible torsion member in the twisting means for absorbing a portion of the twist to which the sample is subjected; and means externally of the enclosure for indicating the extent of twist effected in the sample by the twisting means.

3. Apparatus for measuring low temperature stiffening of elastomers comprising means for supporting each of a plurality of samples of the material to be tested; means enclosing the supporting means for subjecting all of the samples to controlled predetermined temperature conditions; twisting means disposed externally of the enclosing means for rotating each of the supporting means; a flexible torsion member between the twisting means and the supporting means; and means externally of the enclosing means coacting with the twisting means for indicating the extent of twist effected in the sample by the twisting means.

4. Apparatus for measuring low temperature stiffening of elastomers comprising an enclosure; means in said enclosure for supporting a sample of the material to be tested from opposed ends thereof, one of said supporting means being fixed and the other rotatable; twisting means externally of the enclosure; a flexible torsion means between the twisting means and the rotatable supporting means; a scale externally of the enclosure; means on the torsion member for indicating on the scale the twist effected in the sample; and means for varying the temperature of the enclosure over a wide predetermined range of temperatures.

5. Apparatus for measuring low temperature stiffening of elastomers comprising an enclosure, a removable cover for the enclosure; supporting means on the cover for disposition within the enclosure when the cover is in place; a first clamping means secured to the supporting means and a second clamping means extending through the cover for supporting therebetween a sample of the material to be tested; twisting means externally of the enclosure for effecting a partial rotation of the second clamping means to impart a twist to the sample; a flexible torsion member in the twisting means for absorbing a part of the action of the twisting means; and means supported by the flexible torsion member for indicating the relative torque induced in the sample by the twisting means; and means varying the internal temperature of the enclosure.

6. Apparatus for measuring low temperature stiffening of elastomers comprising an enclosure forming a compartment therewithin; clamping means in the compartment for suspending from its opposite ends a sample of the material to be tested; means externally of the enclosure for turning one of the clamping means and introducing a torsional deformation in the sample; means varying the temperature of the sample through a plurality of predetermined stages; flexible torsion means in the turning means for absorbing a portion of torsional deformation imparted by the turning means; a scale externally of the enclosure; and means supported by the flexible torsion means for indicating on the scale the effective twist imparted to the sample by the turning means.

7. Apparatus for measuring low temperature stiffening of elastomers comprising an enclosure; a removable cover for the enclosure; mounting means on the cover for disposition within the enclosure when the cover is in place; two sets of clamping means, one set of which is secured to the mounting means while the other set is rotatably mounted in the cover for supporting therebetween a plurality of samples of material to be tested; twisting means disposed externally of the enclosure, said twisting means embodying a flexible torsion member and a disengageable connection for each of the sets of rotatably mounted clamping means; a scale externally of the enclosure; means connected to the torsion member for indicating on the scale the twist imparted to the sample by the actuation of the twisting means; means for directing a flow of fluid through the enclosure; and means for subjecting the fluid to a wide range of predetermined temperature before it is introduced to the enclosure.

8. Apparatus for measuring low temperature stiffening of elastomers comprising an enclosure; a supporting means in the enclosure for securing each end of a sample of the material to be tested; twisting means externally of the enclosure; a flexible torsion member between the twisting means and one of the supporting means; means supported by the torsion member externally of the enclosure for indicating the degree of twist effected in the sample by the twisting means; and means in the enclosure for subjecting the sample while so supported to a wide range of predetermined temperatures.

9. Apparatus for measuring low temperature stiffening of elastomers comprising an enclosure; a supporting means in the enclosure for securing each end of a sample of the material to be tested; twisting means externally of the enclosure; means for attachment to one of the supporting means and the twisting means for absorbing a portion of the torsional deformation imparted to the sample by the twisting means; means supported by the absorbing member externally of the enclosure for indicating the degree of twist effected in the sample by the twisting means; and means for subjecting the sample while supported in the enclosure to a wide range of predetermined temperatures.

SAMUEL D. GEHMAN.

REFERENCES CITED

The following references are of record in the file of this patent:

UNITED STATES PATENTS

| Number | Name | Date |
|---|---|---|
| 1,281,042 | MacMichael | Oct. 8, 1918 |
| 1,831,320 | Pertz | Nov. 10, 1931 |
| 2,269,305 | Bell | Jan. 6, 1942 |
| 2,303,162 | Godwin et al. | Nov. 24, 1942 |
| 2,404,584 | Liska et al. | July 23, 1946 |
| 2,427,796 | MacDonald | Sept. 23, 1947 |

FOREIGN PATENTS

| Number | Country | Date |
|---|---|---|
| 96,334 | Germany | Feb. 25, 1898 |